US011293353B2

(12) United States Patent
Meisner et al.

(10) Patent No.: US 11,293,353 B2
(45) Date of Patent: Apr. 5, 2022

(54) TRANSIENT CONTROL TO EXTEND PART LIFE IN GAS TURBINE ENGINE

(71) Applicant: United Technologies Corporation, Farmington, CT (US)

(72) Inventors: Richard P. Meisner, Glastonbury, CT (US); David L. Ma, Avon, CT (US); Timothy B. Winfield, Manchester, CT (US); James R. Midgley, Cromwell, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 711 days.

(21) Appl. No.: 15/610,188

(22) Filed: May 31, 2017

(65) Prior Publication Data

US 2018/0347474 A1    Dec. 6, 2018

(51) Int. Cl.
| | |
|---|---|
| *F02C 9/28* | (2006.01) |
| *F01D 5/02* | (2006.01) |
| *F01D 17/06* | (2006.01) |
| *F01D 17/08* | (2006.01) |

(52) U.S. Cl.
CPC ............... *F02C 9/28* (2013.01); *F01D 5/02* (2013.01); *F01D 17/06* (2013.01); *F01D 17/085* (2013.01);
(Continued)

(58) Field of Classification Search
CPC .......... F02C 9/26; F02C 9/28; F05D 2260/80; F05D 2260/941; F05D 2270/11;
(Continued)

(56) References Cited

U.S. PATENT DOCUMENTS

| | | | | |
|---|---|---|---|---|
| 4,625,510 A | * | 12/1986 | Evans ........................ | F02C 9/28 60/39.281 |
| 4,845,943 A | * | 7/1989 | LaPrad ..................... | F02C 9/28 60/773 |

(Continued)

FOREIGN PATENT DOCUMENTS

| | | |
|---|---|---|
| EP | 2937519 | 10/2015 |
| EP | 3121389 | 1/2017 |

OTHER PUBLICATIONS

European Patent Office, European Search Report dated Oct. 9, 2018 in Application No. 18174037.4-1007.

*Primary Examiner* — Arun Goyal
*Assistant Examiner* — William L Breazeal
(74) *Attorney, Agent, or Firm* — Snell & Wilmer L.L.P.

(57) ABSTRACT

A full authority digital engine controller (FADEC) based system is also disclosed. The system includes a processor, and a tangible, non-transitory memory configured to communicate with the processor, the tangible, non-transitory memory having instructions stored thereon that, in response to execution by the processor, cause the FADEC to perform operations. The operations may include measuring a first temperature at a first sensor disposed at a first known location of an engine, measuring a second temperature at a second sensor disposed at a second known location of the engine, and estimating at least one of a stress or a strain of a part or component in the engine based on the first temperature and the second temperature. The system may control fuel flow and/or other engine effectors during a thrust transient to limit the estimated stress or the estimated strain of the component from exceeding a predetermined threshold.

16 Claims, 5 Drawing Sheets

(52) U.S. Cl.
CPC .... *F05D 2260/80* (2013.01); *F05D 2260/941* (2013.01); *F05D 2270/11* (2013.01); *F05D 2270/112* (2013.01); *F05D 2270/114* (2013.01); *F05D 2270/301* (2013.01); *F05D 2270/303* (2013.01); *F05D 2270/304* (2013.01); *F05D 2270/3032* (2013.01); *F05D 2270/3061* (2013.01); *F05D 2270/332* (2013.01); *F05D 2270/54* (2013.01)

(58) Field of Classification Search
CPC ......... F05D 2270/112; F05D 2270/114; F05D 2270/808; G05B 23/0283
See application file for complete search history.

(56) References Cited

U.S. PATENT DOCUMENTS

| | | | | |
|---|---|---|---|---|
| 5,212,943 | A * | 5/1993 | Harris | F02C 9/28 60/39.281 |
| 5,368,444 | A * | 11/1994 | Anderson | F01D 5/3007 416/220 R |
| 7,216,489 | B2 * | 5/2007 | Uluyol | F02C 7/26 60/778 |
| 9,221,535 | B2 | 12/2015 | Gordon et al. | |
| 9,581,086 | B2 | 2/2017 | Tiwari et al. | |
| 2004/0000144 | A1 * | 1/2004 | Rajamani | F02C 9/28 60/772 |
| 2011/0166798 | A1 * | 7/2011 | Knodel | F01D 21/003 702/34 |
| 2014/0284395 | A1 * | 9/2014 | Pilon | F02K 1/008 239/11 |
| 2015/0308347 | A1 * | 10/2015 | Smith | F02C 7/26 60/778 |
| 2016/0123232 | A1 | 5/2016 | Wright et al. | |
| 2016/0160762 | A1 * | 6/2016 | Chandra | F01D 21/003 701/100 |
| 2018/0016935 | A1 * | 1/2018 | Scothern | F01D 21/003 |

* cited by examiner

TRANSIENT CONTROL TO EXTEND PART LIFE IN GAS TURBINE ENGINE

FIELD

The disclosure relates generally to extending component life in gas turbine engines.

BACKGROUND

Engine components typically come with an expected service life. As the engine logs more hours, parts are prone to wear. For example, the turbine section contains parts exposed to extremely high temperatures. The useable life of engine parts is based on a variety of factors. Two such limiting factors include transient thermal and mechanical stresses and strains. The engine components may experience such stresses and strains in particular during acceleration and deceleration. If such stresses are not managed directly by the engine control system, they may result in a significant transient overshoot relative to steady state levels, which may in turn impact service life.

SUMMARY

A method of limiting stress and/or strain in an engine part is provided. The method includes the steps of estimating temperature at a life limiting location on the part, estimating a stress and/or strain of the engine based on the temperature, temperature gradient, and/or rotational speed, and controlling engine acceleration or deceleration rate to limit stress and/or strain from exceeding a predetermined limit.

In various embodiments, the predetermined limit may, for example, correspond to final steady state stress or strain, plus some allowable transient adjustment. The method may further include measuring engine flow rates and rotational speeds at known locations of the engine, and/or estimating a node temperature of the component based on at least one of the temperature, the pressure, and the engine air flow rate. The strain may be estimated based on the temperature, the pressure or flow rate, and the engine rotational speed. The component may be, for example, a rotor in a turbine section. The temperature may be measured at one of station 2.5 or station 3, for example, though other measurement points may also be used at various engine stations.

A system for controlling acceleration and deceleration of the engine is also provided. The system may adjust fuelflow to the engine in response to a requested change in thrust, while limiting the transient response so as to protect engine operability constraints such as compressor stall and combustor lean blowout. Such constraints are typically avoided by limiting fuelflow and/or other effectors via limits on acceleration/deceleration (i.e., rate of change of rotational speed) and/or fuelflow divided by burner pressure.

In various embodiments, the controller may calculate a stress or a strain of a part or component based on the local temperature, pressure, flow, and rotational speed. The controller may also limit the acceleration and/or deceleration rate of the engine or directly limit effectors such as fuel flow to prevent stress or strain from exceeding a predetermined limit. The controller may be a full authority digital engine controller (FADEC). For example, the first sensor may be disposed at station 3 and the second sensor may be disposed at station 2.5.

A full authority digital engine controller (FADEC) based system is also disclosed. The system includes a processor, and a tangible, non-transitory memory configured to communicate with the processor, the tangible, non-transitory memory having instructions stored thereon that, in response to execution by the processor, cause the FADEC to perform operations. The operations may include measuring a first temperature at a first sensor disposed at a first known location of an engine, measuring a second temperature at a second sensor disposed at a second known location of the engine, and estimating at least one of a stress or a strain of a part in the engine based on the first temperature and the second temperature. The system may control an acceleration or deceleration rate of the engine in response to the estimated stress or the estimated strain of the part exceeding a predetermined threshold.

In various embodiments, the operations may further include estimating a node temperature of the component based on at least one of the first temperature or the second temperature. The component may be a BOAS or a rotor in a turbine section, for example. The first known location may for example be station 2.5, and the second known location may be station 3.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
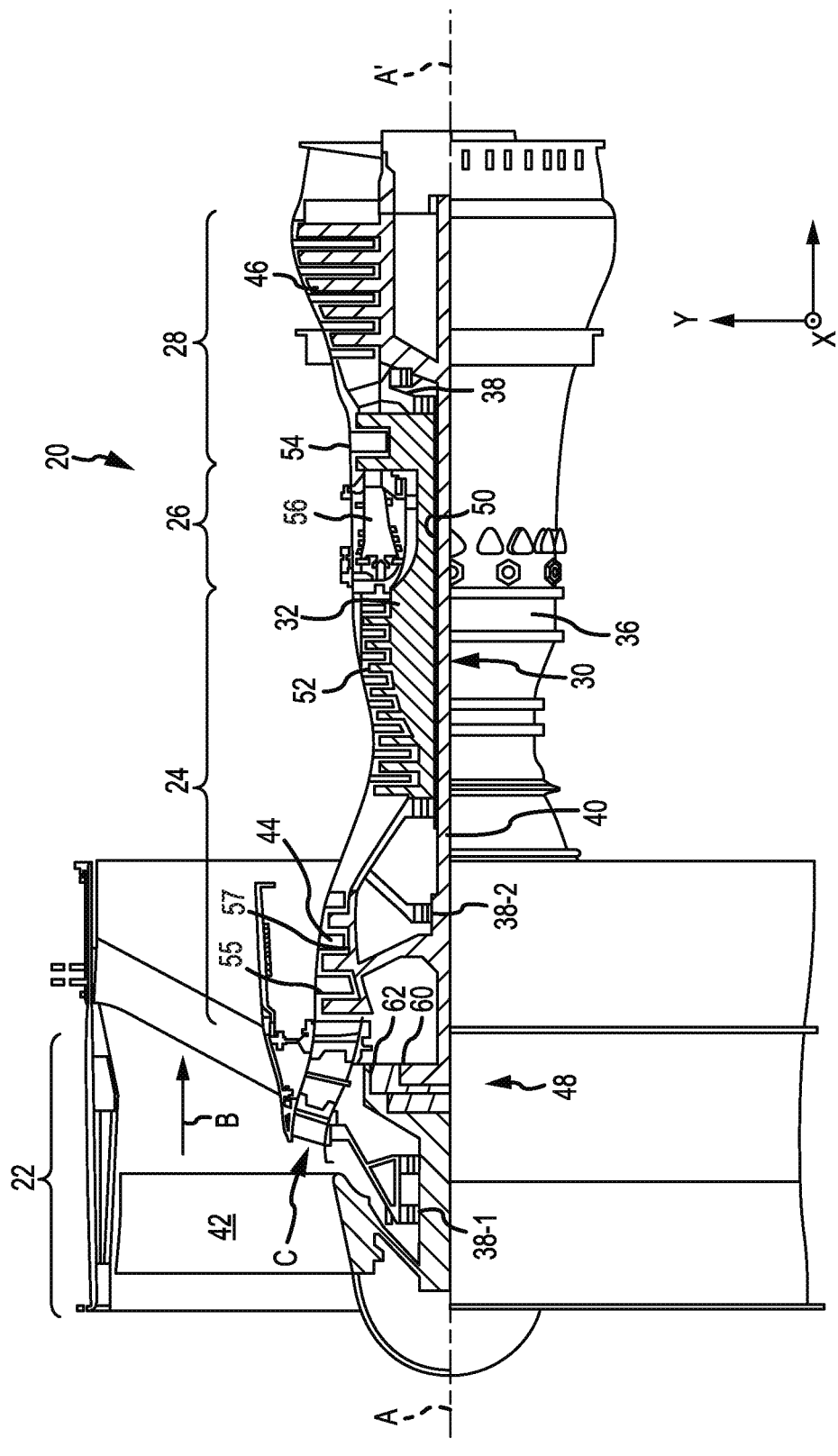
FIG. 1 illustrates a gas turbine engine, in accordance with various embodiments.

Referring now to FIG. 1, an exemplary gas turbine engine 20 is shown, in accordance with various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass-flow path B while compressor section 24 can drive coolant along a core-flow path C for compression and communication into combustor section 26 then expansion through turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly enclosed within a gear housing that couples inner shaft 40 to a rotating fan structure. High speed spool 32 may comprise an outer shaft 50 that interconnects a high-pressure compressor 52 and high-pressure turbine 54. Airfoils 55 coupled to a rotor of high-pressure turbine may rotate about the engine central longitudinal axis A-A' or airfoils 55 coupled to a stator may be rotationally fixed about engine central longitudinal axis A-A'. Airfoils 55 coupled to a stator may be held in place by inner shroud 57.

A combustor 56 may be located between high-pressure compressor 52 and high-pressure turbine 54. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow along core-flow path C may be compressed by low-pressure compressor 44 then high-pressure compressor 52, mixed and burned with fuel in combustor 56, then expanded over high-pressure turbine 54 and low-pressure turbine 46. Turbines 46, 54 rotationally drive the respective low speed spool 30 and high speed spool 32 in response to the expansion.

Figure 2:
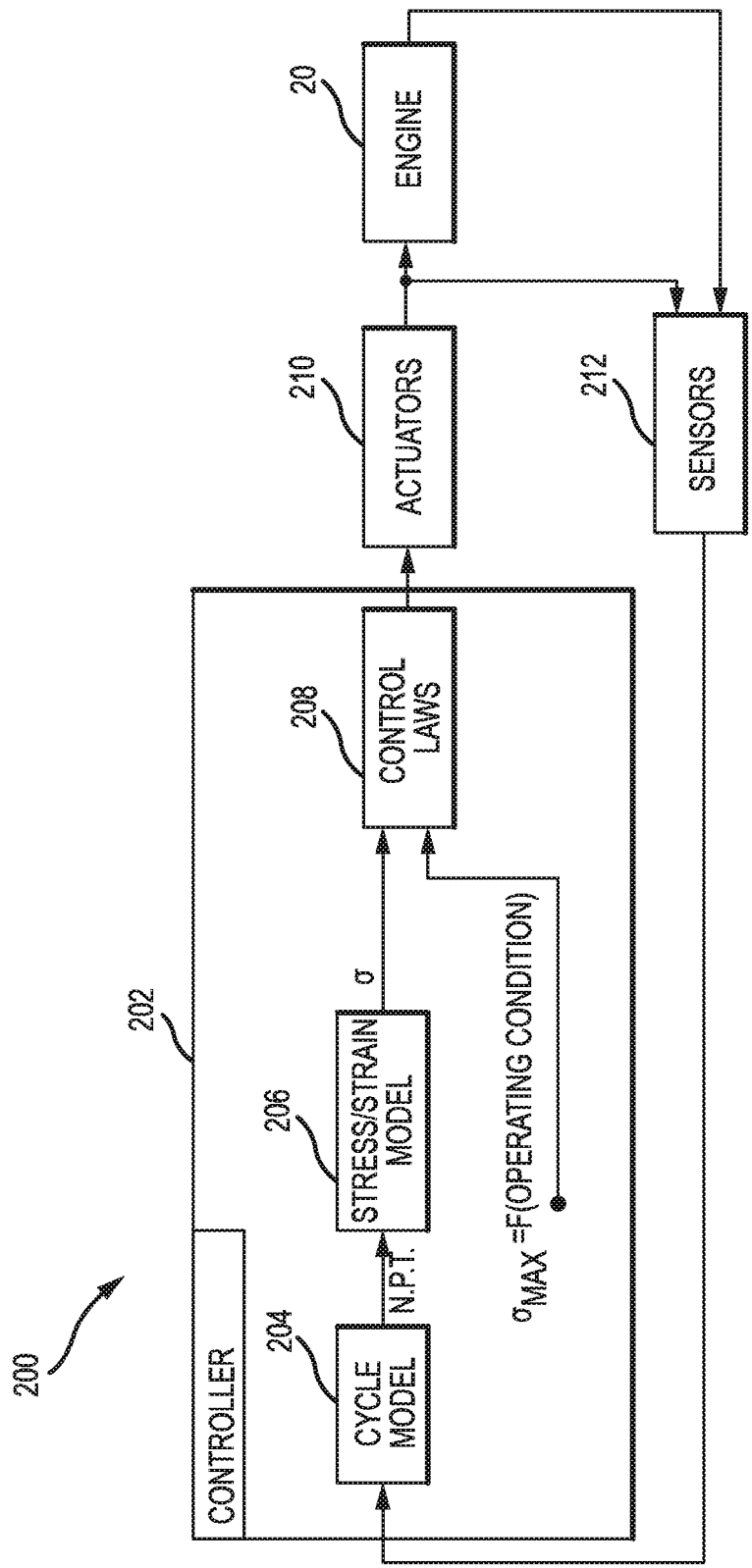
FIG. 2 illustrates a controller configured to manage engine speed and extend the life span of engine components, in accordance with various embodiments.

Referring now to FIG. 2, control system 200 is shown according to various embodiments. Control system 200 may include a controller 202. Controller 202 may comprise a full authority digital engine control (FADEC) system, which may comprise an electronic control box (ECB). A FADEC may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor may thus be configured to implement various logical operations in response to execution of instructions, for example, instructions stored on a non-transitory, tangible, computer-readable medium. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

In various embodiments, controller 202 may include logic executable in concert with actuators 210 and sensors 212 to control engine 20. Controller 202 may command actuators 210 to adjust engine parameters such as fuel flow, vane angles, air flow, rotational speed, and/or other engine parameters. The term actuator is meant to encompass pumps, solenoids, actuators, or any other component of engine 20 controllable by an electronic or hydraulic signal. Sensors 212 may detect the state of actuators 210 as well as engine characteristics such as temperature, pressure, vibration frequency, vibration amplitudes, or other characteristics of engine 20.

In various embodiments, executable logic in controller 202 may include a cycle model 204, a stress/strain model 206, and control laws 208. Cycle model 204 may analyze signals from sensors 212 to output pressure measurements, temperature measurements, air flow rate measurements, and engine speed measurements. Cycle model 204 may also model engine 20 and generate estimates of pressure, temperature, flow rate, and engine speed at various locations remote from the sensors 212 using the input from sensors 212.

In various embodiments, stress/strain model 206 may take as inputs various measurements and/or estimates of pressure, temperature, flow rate, engine rotational speed, or other suitable characteristics to estimate the stress and/or strain on components of engine 20. Stress/strain model 206 may estimate the strain using control logic 300 of FIG. 3. Stress/strain model 206 may output a stress estimate and/or a strain estimate for evaluation by control laws 208.

In various embodiments, control laws 208 may evaluate the stress estimate and/or the strain estimate by comparing the estimates to a stress threshold and/or a strain threshold. The stress threshold and/or the strain threshold may be determined as a function of the various operating conditions passed into control laws 208 from stress/strain model 206 and/or cycle model 204. The predetermined threshold values for stress and/or strain may thus correspond to final steady-state stress or steady-state strain, plus some allowable transient adjustment. The control laws may control engine speed and other conditions by commanding actuators 210 as described above.

Figure 3:
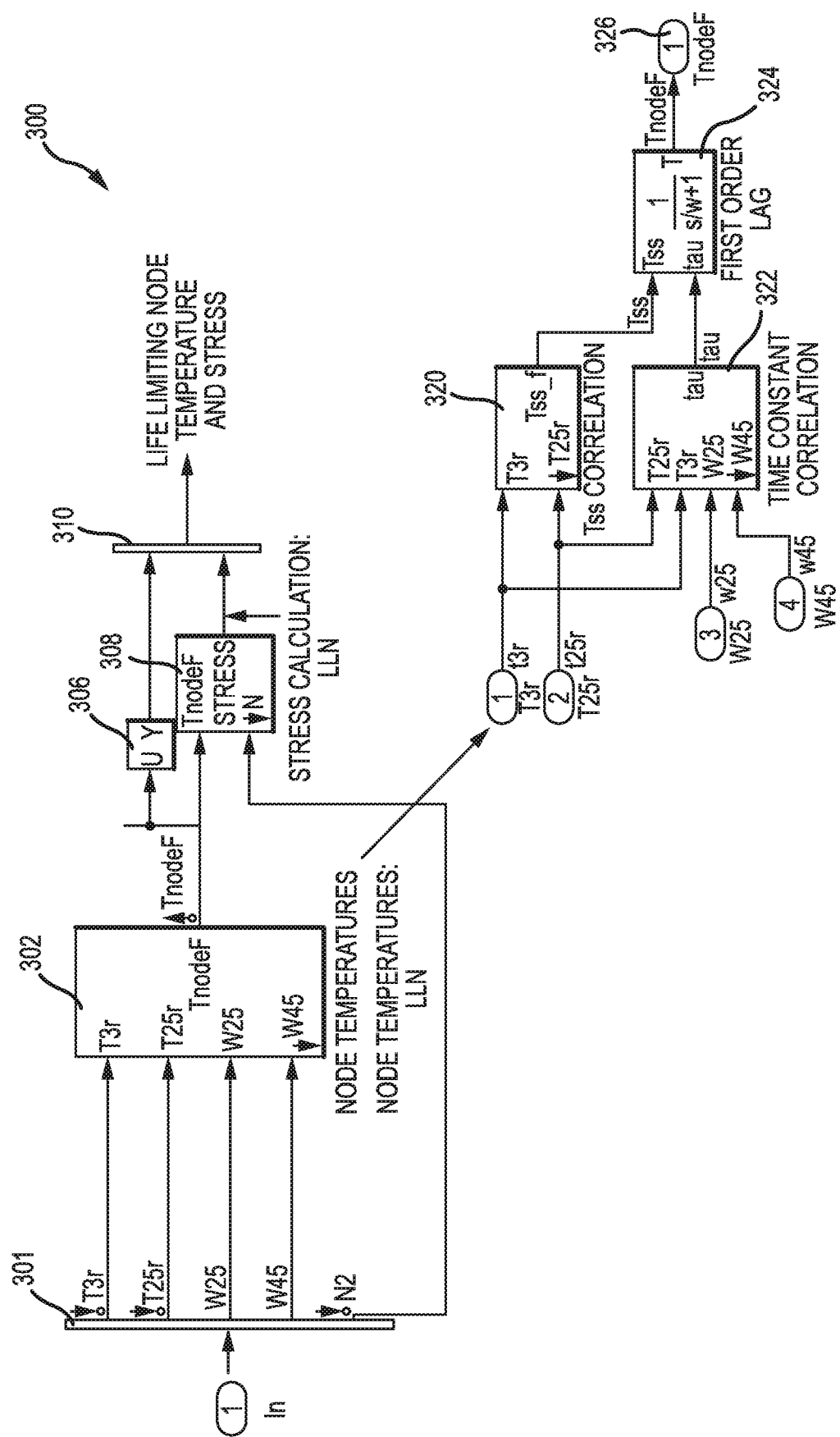
FIG. 3 illustrates exemplary control logic to estimate stress and/or strain and manage engine speed, in accordance with various embodiments.

With reference to FIG. 3, control logic 300 is shown for estimating stress and/or strain, in accordance with various embodiments. The various components of control logic 300 may be implemented on software components running on the FADEC or a general purpose processor, a digital signal processor (DSP), an application specific integrated circuit (ASIC), a field programmable gate array (FPGA) or other programmable logic device, discrete gate or transistor logic, discrete hardware components, or any combination thereof. Control logic 300 may receive inputs 301 from cycle model 204 and/or sensors 212. Inputs 301 may include temperature measurements from various locations in engine 20. Inputs 301 may include temperatures, pressures, and flow rates measured at various positions in engine 20. For example, inputs 301 may include temperatures taken using thermocouples at various stages of the turbine such as the temperature measured at station 2, station 2.5, station 3, station 4, station 4.5, station 5, or other locations in the gas turbine engine suitable for housing a thermocouple and sending to control logic 300 for analysis. The station locations may refer to locations on engine 20 such as, for example, the entrance to the inlet (1), entrance to the low compressor (2), entrance to high compressor (2.5), high compressor exit (3), entrance to high turbine (4), entrance to low turbine (4.5), exit of turbine (5), etc.

In various embodiments, logic 302 may use inputs 301 to estimate node temperatures at locations not measured and input into logic 302. The node temperature may be the estimated temperature of a component in engine 20 placed under stress and/or strain. The node temperature and engine speed may be input into stress estimation logic 308. The stress may be output to bus 310 along with temperature 306 of the node.

Correlation logic 320 may perform a correlation between the temperatures at various stations in the gas turbine engine. For example, correlation logic may determine stress, strain, flow rate, pressure, and/or other temperatures based on the temperatures at station 3 and station 2.5. Correlation logic 322 may also generate an input to node temperature logic 324, which outputs node temperature 326 for use in stress and/or strain estimation logic 308.

Figure 4:
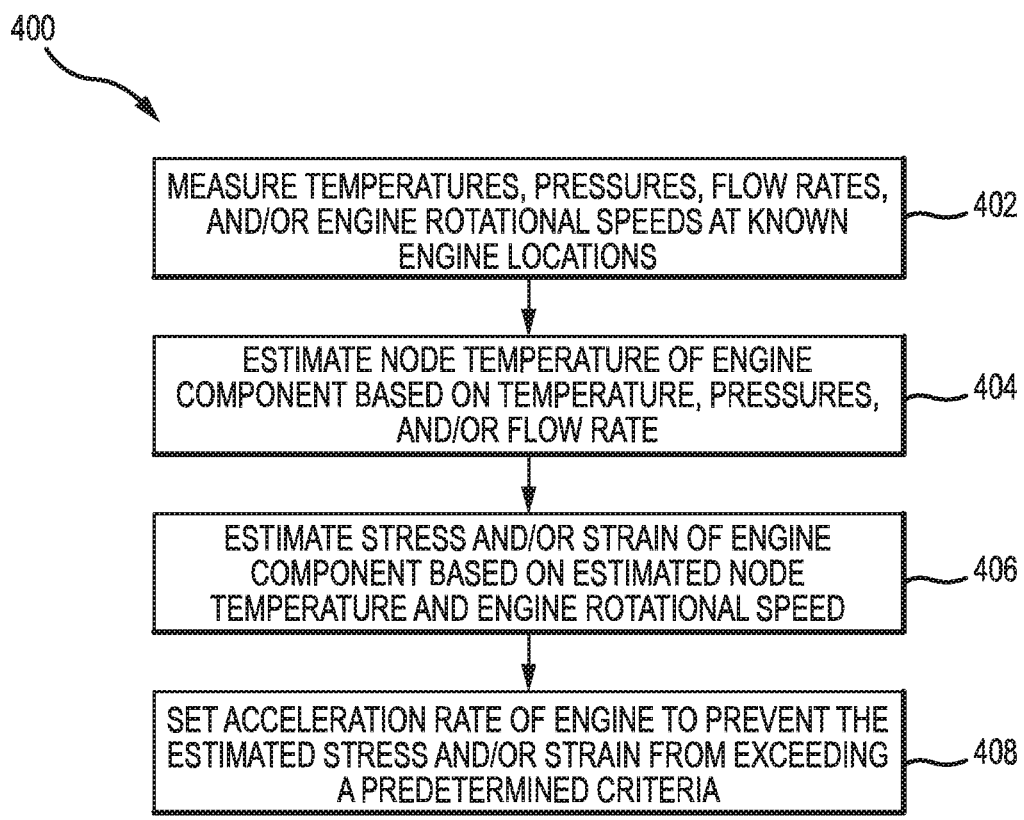
FIG. 4 illustrates a process for controlling engine speed to extend component life span, in accordance with various embodiments.

With reference to FIG. 4, process 400 is shown for controlling engine acceleration to limit stress on components of engine 20, in accordance with various embodiments. Process 400 may be executed in controller 202 (e.g., the FADEC) to control engine acceleration. As used herein the term acceleration may describe both acceleration and deceleration (e.g., negative acceleration and positive acceleration). Controller 202 may measure temperatures, pressures, flow rates, and/or engine rotational speed in engine 20 at known locations using sensors 212 as described above (Step 402).

In various embodiments, controller 202 may estimate a node temperature of an engine component based on the measured temperatures, pressures, and/or flow rates (Step 404). Controller may use control logic 300 to make the estimation. Controller 202 may estimate a stress (or strain) of the engine component based on the estimated node temperature of the engine component (Step 406). The stress may be compared to a threshold value. The stress threshold may thus be a stress value. Controller 202 may adjust engine acceleration rates to maintain the stress below the threshold value.

In various embodiments, controller 202 may also select the engine acceleration rate to maintain the stress levels at the threshold value. Maintaining the engine rate at the threshold value may result in good deceleration performance, for example, while extending the service life of engine components by reducing the peak stress experienced by the components. The threshold may thus be a transient stress limit or transient strain limit. Controller 202 may adjust actuators 210 to adapt engine speeds to the limits, and controller 202 may also allow for slight overshoots or variations in the transient limits. The threshold value may be selected based by evaluating the components of engine 20 to determine suitable maximum stress rates to extend component life and offer acceptable performance. In that regard, controller 202 may set the acceleration rate of the engine in response to the estimated stress (or strain) meeting a predetermined criteria (Step 408).

Figure 5:
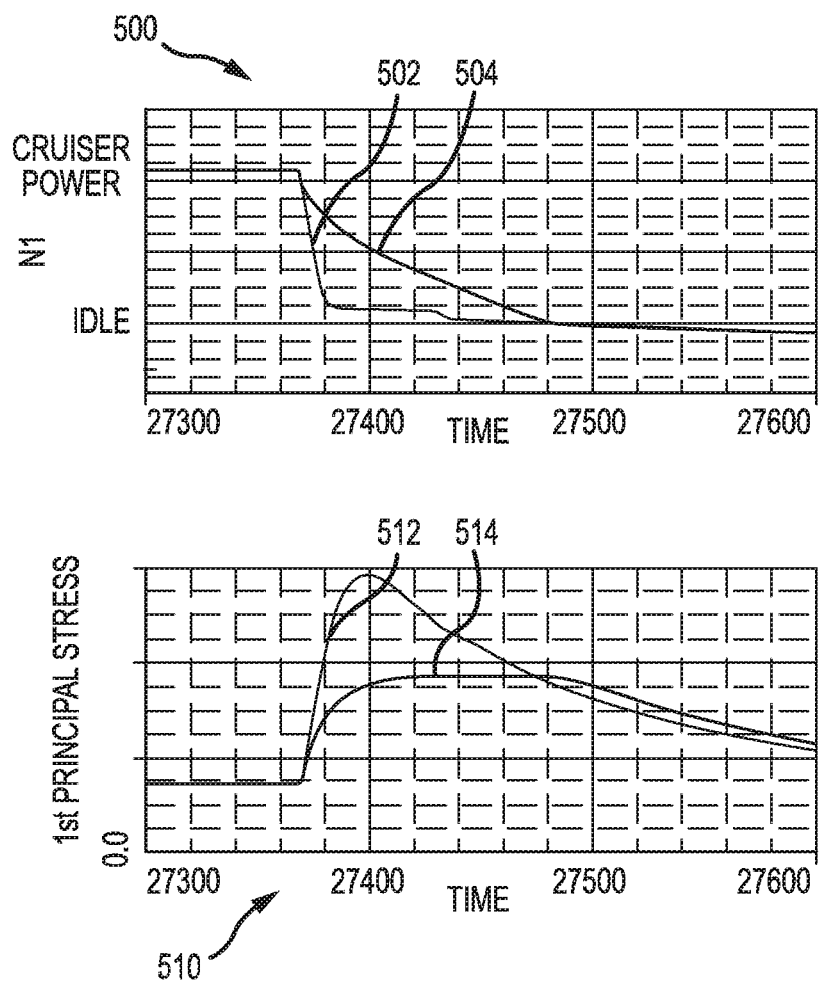
FIG. 5 illustrates graphs depicting the stress experienced by a component in a gas turbine engine during deceleration, in accordance with various embodiments.

With reference to FIG. 5, graph 500 and graph 510 are shown depicting engine speed versus time and stress versus time for a stress limited deceleration and a standard deceleration without stress limitations, in accordance with various embodiments. Graph 500 illustrates engine speeds in revolutions per minute (RPM). Plot 502 depicts a standard deceleration in which the engine speed is reduced rapidly. The slope of plot 502 is representative of the acceleration of the engine at a point in time. Plot 504 depicts a stress-limited deceleration in which the engine speed is reduced gradually relative to plot 502. The slope of plot 504, and thus the acceleration of the engine, is slower than in plot 502.

In various embodiments, graph 510 depicts the stress corresponding to the engine speeds of graph 500. Plot 512 depicts stress experienced at an engine component during a standard deceleration without stress limitation. Plot 514 depicts stress experienced at an engine component with stress limitations in place. The stress limiting criteria in plot 514 is that the stress is held below a threshold value, which is illustrated by the flat portion of plot 514 occurring concurrently with the spike in stress of plot 512. By limiting the maximum stress experienced by key engine components, the time on wing for those components may be increased.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of stress-limited deceleration for managing engine component life in a part in an engine comprising:
   measuring a first temperature at a first location of the engine;
   measuring at least one of a pressure, an air flow rate, or a rotational speed of the engine;
   estimating at least one of a stress or a strain of the part based on the first temperature and the at least one of the pressure, the air flow rate, or the rotational speed of the engine;
   controlling a deceleration rate of the engine based on the at least one of the stress or the strain of the part, wherein the deceleration rate of the engine is decreased in response to the at least one of the stress or the strain exceeding a threshold value, the threshold value being determined during operation based on at least one of an estimated stress or an estimated strain experienced by the part during a steady-state condition of the engine, wherein determination of the threshold value includes adding an adjustment value to the at least one of the estimated stress or the estimated strain experienced by the part during the steady-state condition such that the threshold value is greater than the at least one of the estimated stress or the estimated strain experienced by the part during the steady-state condition, and wherein controlling the deceleration rate of the engine comprises controlling fuel flow delivered to the engine.

2. The method of claim 1, further comprising measuring a second temperature at a second location of the engine.

3. The method of claim 2, further comprising estimating a node temperature of the part based on the first temperature, the second temperature, and the at least one of the pressure or the air flow rate.

4. The method of claim 3, wherein the stress or the strain is estimated based on the node temperature and the rotational speed of the engine.

5. The method of claim 4, wherein the part comprises a rotor.

6. The method of claim 4, wherein the first temperature is measured at an entrance to a compressor of the engine and the second temperature is measured at an exit of the compressor.

7. A system for stress-limited deceleration of an engine comprising:
   a controller configured to control a deceleration rate of the engine based on at least one of a stress or a strain of a part of the engine, wherein the controller is configured to estimate the at least one of the stress or the strain of the part using a first temperature and at least one of a pressure, a flow rate, or a rotational speed of the engine, and wherein the controller is configured to decrease the deceleration rate of the engine in response to the at least one of the stress or the strain of the part exceeding a threshold value, the threshold value being determined during operation based on at least one of an estimated stress or an estimated strain experienced by the part during a steady-state condition of the engine, and wherein determination of the threshold value includes adding an adjustment value to the at least one of the estimated stress or the estimated strain experienced by the part during the steady-state condition such that the threshold value is greater than the at least one of the estimated stress or the estimated strain experienced by the part during the steady-state condition;
   a first sensor in communication with the controller and coupled to the engine, wherein the first sensor is configured to measure the first temperature;
   a second sensor in communication with the controller and coupled to the engine, wherein the second sensor is configured to measure the at least one of the pressure, the flow rate, or the rotational speed of the engine; and
   an actuator coupled to the engine and configured to adjust a fuel flow delivered to the engine in response to a request from the controller.

8. The system of claim 7, wherein the controller is configured to set the deceleration rate of the engine to maintain the at least one of the stress or the strain at the threshold value.

9. The system of claim 7, wherein the controller is a full authority digital engine controller (FADEC).

10. The system of claim 7, wherein the first sensor is disposed at an exit of a compressor, and wherein the second sensor is disposed at an entrance to the compressor of the engine.

11. The system of claim 7, wherein the controller is configured to sample the first sensor and the second sensor at a frequency greater than or equal to 1 Hz.

12. The system of claim 11, wherein the part comprises a rotor.

13. A full authority digital engine controller (FADEC) based system configured for stress-limited deceleration, comprising:
   a processor;
   a tangible, non-transitory memory configured to communicate with the processor, the tangible, non-transitory memory having instructions stored thereon that, in response to execution by the processor, cause the FADEC to perform operations comprising:
   measuring a first temperature at a first sensor disposed at a first location of an engine;
   measuring a second temperature at a second sensor disposed at a second location of the engine;
   estimating at least one of a stress or a strain of a component in the engine based on the first temperature and the second temperature;

controlling a deceleration rate of the engine based on the at least one of the stress or the strain, wherein the deceleration rate of the engine is decreased in response to the at least one of the stress or the strain of the component exceeding a threshold value, and wherein determination of the threshold value includes adding an adjustment value to at least one of an estimated steady-state stress or an estimated steady-state strain experienced by the component during a steady-state condition such that the threshold value is greater than the at least one of the estimated steady-state stress or the estimated steady-state strain experienced by the component during the steady-state condition.

14. The FADEC based system of claim 13, wherein the operations further comprise estimating a node temperature of the component based on at least one of the first temperature or the second temperature.

15. The FADEC based system of claim 13, wherein the component comprises a rotor.

16. The FADEC based system of claim 13, wherein the first location is at an entrance to a compressor and the second location is at an exit of the compressor.

* * * * *